(12) United States Patent
Reindl

(10) Patent No.: US 7,807,266 B2
(45) Date of Patent: Oct. 5, 2010

(54) COMPOSITE ELEMENTS

(75) Inventor: Armin Reindl, Munich (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 497 days.

(21) Appl. No.: 10/576,469

(22) PCT Filed: Oct. 23, 2004

(86) PCT No.: PCT/EP2004/011995

§ 371 (c)(1), (2), (4) Date: Apr. 20, 2006

(87) PCT Pub. No.: WO2005/042239

PCT Pub. Date: May 12, 2005

(65) Prior Publication Data

US 2007/0082204 A1    Apr. 12, 2007

(30) Foreign Application Priority Data

Oct. 27, 2003  (DE) ............... 103 50 238

(51) Int. Cl.
- B32B 27/40 (2006.01)
- B32B 5/16 (2006.01)
- B32B 15/095 (2006.01)
- B29C 45/14 (2006.01)
- B63B 5/24 (2006.01)

(52) U.S. Cl. .............. 428/425.8; 114/355; 114/356; 114/357; 264/261; 264/267; 264/328.8; 428/220; 428/327; 428/422.8; 428/423.1; 428/425.1; 428/457

(58) Field of Classification Search ......... 114/255–257, 114/355–357; 264/261, 267, 328.8; 428/220, 428/327, 422.8, 423.1, 425.1, 425.8
See application file for complete search history.

(56) References Cited

U.S. PATENT DOCUMENTS

| | | | | |
|---|---|---|---|---|
| 2,855,021 A | * | 10/1958 | Hoppe | 156/78 |
| 3,814,659 A | * | 6/1974 | Nadeau | 428/215 |
| 3,867,492 A | * | 2/1975 | Drostholm | 264/46.6 |
| 4,089,285 A | * | 5/1978 | Okamoto et al. | 114/74 A |
| 5,218,919 A | * | 6/1993 | Krulikowski et al. | 114/74 A |
| 5,778,813 A | | 7/1998 | Kennedy | |
| 6,050,208 A | * | 4/2000 | Kennedy | 114/74 A |
| 6,984,452 B2 | * | 1/2006 | Kennedy | 428/423.1 |
| 7,261,932 B2 | * | 8/2007 | Kennedy | 428/156 |
| 2003/0148080 A1 | * | 8/2003 | Forster et al. | 428/216 |
| 2004/0045492 A1 | * | 3/2004 | Dierssen | 114/356 |
| 2005/0244651 A1 | * | 11/2005 | Stadler et al. | 428/423.1 |

FOREIGN PATENT DOCUMENTS

| | | |
|---|---|---|
| DE | 198 25 083 | 12/1999 |
| DE | 198 25 084 | 12/1999 |
| DE | 198 25 085 | 12/1999 |
| DE | 198 25 087 | 12/1999 |
| DE | 198 35 727 | 2/2000 |
| GB | 2355957 A * | 5/2001 |
| WO | 02/40265 | 5/2002 |
| WO | 03/002324 | 1/2003 |
| WO | 03/080330 | 10/2003 |
| WO | WO 03/103958 * | 12/2003 |

OTHER PUBLICATIONS

Machine translation of WO 03/103958.*
Polyurethane Handbook, ed. Günter Oertel, Hanser Garner Publications, Inc., ch. 5, 5.1.2, pp. 202-203, Munich, 1994.

* cited by examiner

*Primary Examiner*—Callie E Shosho
*Assistant Examiner*—John Freeman
(74) *Attorney, Agent, or Firm*—Oblon, Spivak, McClelland, Maier & Neustadt, L.L.P.

(57) ABSTRACT

Composite elements having the following layer structure:
(i) from 2 to 20 mm of metal, plastic or wood,
(ii) from 10 to 300 mm of polyisocyanate polyadducts,
(iii) from 2 to 20 mm of metal, plastic or wood,
the layer (ii) containing prefabricated polyisocyanate polyadducts (x) which are adhesively bonded by polyisocyanate polyadducts (xx) to the layers (i) and (iii), and the polyisocyanate polyadducts (x) being pieces having a volume of from 4 to 1 000 cm$^3$.

15 Claims, No Drawings

COMPOSITE ELEMENTS

The present invention relates to composite elements which have the following layer structure:
(i) from 2 to 20 mm, preferably from 2 to 10 mm, particularly preferably from 5 to 10 mm, of metal, plastic or wood, preferably metal,
(ii) from 10 to 300 mm, preferably from 10 to 100 mm, of polyisocyanate polyadducts, preferably polyurethanes, which, if appropriate, may contain urea and/or isocyanurate structures,
(iii) from 2 to 20 mm, preferably from 2 to 10 mm, particularly preferably from 5 to 10 mm, of metal, plastic or wood, preferably metal.

The length data stated at the outset for the layers (i), (ii) and (iii) relate to the thicknesses of the respective layer. In addition, the present invention relates to processes for the production of these composite elements and ships and structures comprising the novel composite elements.

For the construction of ships, for example ships' hulls and hold covers, bridges, roofs or multistory buildings, it is necessary to use structural parts which can withstand considerable loads due to external forces. Owing to these requirements, said structural parts usually consist of metal plates or metal supports which are reinforced by an appropriate geometry or suitable struts. Thus, owing to enhanced safety standards, hulls of tankers usually consist of an inner and an outer hull, each hull being composed of 15 mm thick steel plates which are connected to one another by about 2 m long steel struts. Since these steel plates are exposed to considerable forces, both the outer and the inner steel hulls are stiffened by means of welded-on reinforcing elements. Both the considerable amounts of steel required and the time-consuming and labor-intensive production are disadvantages of these classical structural parts. Moreover, such structural parts have a considerable weight, resulting in a lower tonnage of the ships and an increased fuel requirement. Additionally, such classical structural elements based on steel require intensive care since both the outer surface and the surfaces of the steel parts between the outer and inner hull regularly have to be protected from corrosion.

SPS (sandwich plate system) elements which comprise a composite of metal and plastic are known as a substitute for the steel constructions. The adhesion of the plastic to the two metal layers results in composite elements having extraordinary advantages over known steel constructions. Such SPS elements are disclosed in U.S. Pat. No. 6,050,208, U.S. Pat. No. 5,778,813, DE-A 198 25 083, DE-A 198 25 085, DE-A 198 25 084, DE-A 198 25 087 and DE-A 198 35 727. Usually, these composite elements are produced by casting or injecting the starting materials for the preparation of polyisocyanate polyadducts in a single operation between the metal plates. Since the reactive starting components for the preparation of the plastics in the composite element begin to react directly on mixing and complete filling of the space between the metal plates is a precondition for a satisfactory product, the process for injecting the starting components is a decisive and critical step in the production of the composite elements. Moreover, owing to the considerable heating as a result of the reaction of the starting components, considerable shrinkage of the elastomer layer may occur during the subsequent cooling, which shrinkage is undesirable since it may lead to detachment of the elastomer from the metal.

It is an object of the present invention to provide an improved process for the production of the composite elements described at the outset and to improve the composite elements described at the outset with regard to shrinkage and adhesion. By means of this process, it was intended especially to optimize the filling of the space between the plates (i) and (iii) in particular with reactive starting components for the preparation of plastics (ii) between the plates (i) and (iii). This production process was intended in particular substantially to reduce the proportion of faulty elements and to permit safe introduction of liquid components between the plates of the composite element.

We have found that this object is achieved, according to the invention, if the layer (ii) contains polyisocyanate polyadducts (x) which have been prefabricated, i.e. not prepared in the layer (ii), and which are adhesively bonded to the layers (i) and (iii) by polyisocyanate polyadducts (xx), and the polyisocyanate polyadducts (x) are pieces having a volume of from 4 to 1 000 $cm^3$, preferably from 8 to 550 $cm^3$, i.e. the individual piece has a volume of from 4 to 1 000 $cm^3$, preferably from 8 to 550 $cm^3$.

What is important to the invention is therefore that, in contrast to the known technical teachings, in which either the total space of the layer (ii) is filled with liquid components or completely prefabricated polyurethane panels are adhesively bonded to the layers (i) and (iii), in the present case in particular polyurethane pieces (x) which have the volume according to the invention are introduced into the space between (i) and (iii), and the space between (i) and (iii) which the layer (ii) is to occupy and which is not occupied by (x) is then filled with liquid starting components for the preparation of (xx). The liquid starting components for the preparation of (xx) preferably completely include (x), i.e. wet (x), particularly preferably completely, if appropriate with the exception of the surface of (x) which is in direct contact with (i) and (iii). As a result of the curing of (xx), (x) is preferably adhesively bonded to (i) and (iii) and incorporated and fixed in the layer (ii).

This procedure has the following advantages:

Relatively large cavities (layers (ii) having relatively large volumes) can also be produced since a part of their volume is occupied by prefabricated polyurethanes and hence limitation by the injection volume is eliminated.

The prefabricated polyurethanes (x) considerably reduce the shrinkage of the layer (ii) after production, since the volume which is occupied by the reactive system (xx) is substantially reduced.

Waste materials which can be comminuted by known and conventional methods to pieces having the volume according to the invention are also accessible to expedient recycling.

Owing to the chemical similarity of the systems (x) and (xx), which are preferably of the same type, very good adhesion between (x), (xx), (i) and (iii) is ensured.

The polyisocyanate polyadducts (x) and preferably also the polyisocyanate polyadducts (xx) preferably have a density of from 900 to 1 200, particularly preferably from 1 000 to 1 100, $kg/m^3$.

The polyisocyanate polyadducts (x) are usually pieces which are produced in a separate operation in a shaping unit. Preferably, the polyisocyanate polyadducts (x) are produced by comminuting larger pieces of the polyisocyanate polyadducts, for example waste pieces or pieces specifically prefabricated for this comminution, e.g. panels. The comminution can be effected by generally known methods, for example by comminution in shredder units.

Preferably the polyisocyanate polyadducts (x), particularly preferably also the polyisocyanate polyadducts (xx), are compact polyisocyanate polyadducts.

The prefabricated polyisocyanate polyadducts (x) may have an irregular or regular, angular or round shape, usually depending on the production method.

The polyisocyanate polyadducts (x) preferably occupy from 10 to 90% of the volume of the layer (ii). Particularly preferably, the polyisocyanate polyadducts (xx) occupy from 10 to 90% of the volume of the layer (ii), i.e. the space of the layer (ii) which is not filled with (x) is particularly preferably occupied by (xx).

Even when (x) and (xx) are products of the same type, it is possible to establish on the basis of the interface that prefabricated pieces which were covered with a liquid reactive system were used.

The novel process can be described as follows:

Process for the production of composite elements which have the following layer structure:

(i) from 2 to 20 mm of metal, plastic or wood,
(ii) from 10 to 300 mm of polyisocyanate polyadducts,
(iii) from 2 to 20 mm of metal, plastic or wood, polyisocyanate polyadducts (x) being introduced into the space of the layer (ii), and the layer (ii) then being filled with liquid starting materials for the preparation of polyisocyanate polyadducts (xx).

The space to be filled preferably has a width of from 0.5 to 4 m, particularly preferably from 1 to 3 m, a length of from 1 to 12 m, particularly preferably from 4 to 8 m, and a height, i.e. a distance between the layers (i) and (iii), of from 20 to 150 mm, particularly preferably from 30 to 60 mm, i.e. the layers (i) and (iii) preferably likewise have at least the stated length and width.

The novel filling process is therefore preferably divided into the following two steps:

In a first step, the prefabricated, preferably clean, i.e. particularly preferably dust- and grease- and oil-free, polyisocyanate polyadducts (x) are introduced into the space which is subsequently to represent the layer (ii). As stated above, (x) preferably does not occupy the entire space of the layer (ii). Preferably, the prefabricated polyisocyanate polyadducts (x) are dried, either before they are introduced into the mold or in the mold into which the liquid, reactive starting components for the preparation of (xx) are introduced. The drying can be effected by means of general methods, for example by hot, preferably dried, air.

In a second operation, the remaining space of the layer (ii) which is not filled with (x) is then filled, preferably completely, with the liquid starting components for the preparation of (xx).

It is difficult to judge the amounts of starting materials for the preparation of (xx) so that, in the final filling process, the space (R) to be filled is just filled but overflow is prevented. In the final filling process, a larger amount of starting components for the preparation of (ii) is therefore preferably introduced into the space between (i) and (iii) than said space can hold. The resulting overflow is preferably removed via orifices (v). As soon as the space between (i) and (iii) is completely filled with the starting components for the preparation of (xx), the filling may be terminated on the basis of a rise of the liquid in the tube, which is preferably transparent, and the orifices (iv) and (v) are closed. The closing of the orifices can be effected, for example, by means of a plastic or metal plug, preferably with a screw closure, which is preferably present either in the overflow vessel or preferably between overflow vessel and (i) and/or (iii). The orifices (iv) preferably remain closed to the end of the curing process of the mixture (a) and (b) by the fixed mixing head. The space to be filled between (i) and (iii) preferably has only the orifices (iv) and (v), the outflow end, preferably the mixing head, being present at (iv) and it being possible to apply the preferred reduced pressure at (v). Since, in this preferred embodiment no air can enter the space to be filled, it is possible to generate reduced pressure.

Usually, the layers (i) and (iii) have no features which can serve for fastening of an outflow end for filling the space between (i) and (iii) with liquids. The expression outflow end may mean conventional apparatuses with the aid of which liquids are filled, for example tank nozzles, tube ends, mixing heads of static mixers or the like. The outflow end is preferably a mixing head. Such mixing heads are generally known and commercially available, for example, in association with conventional metering means for polyurethane systems. The fastening of the outflow end, preferably of the mixing head, can preferably be effected by screwing the outflow end of the conveying apparatus or a holder for the outflow end of the conveying apparatus at at least three points, preferably from three to six points, particularly preferably four or five points, to the layer (i). The liquid is preferably filled through at least one orifice (iv) in (i) and/or (iii) into the space between (i) and (iii). For fastening, for example of a mixing head, bolts having a thread which serve for fastening the mixing head or a holder for the mixing head can preferably be driven into the layer (i). These bolts can preferably taper on the side facing away from the thread, in order to enable them to be introduced more easily into the layer (i). The bolts preferably have a diameter of from 6 to 20 mm and a length of from 8 to 42 mm. The thread, which points outward after fixing of the bolts, i.e. on that side of (i) which faces away from (iii), preferably has a length of from 4 to 30 mm. The bolts are introduced, for example, by driving with the aid of a bolt driver, which is commercially available, for example, from Hilti. (i) preferably therefore has a thread with the aid of which the outflow end at the orifice (iv) through which the liquid is filled is screwed to (i). For improving the seal between the outflow end and the layer (i), an O-ring of a resilient material can preferably be fixed between the layer (i) and the mixing head. Such O-rings are generally known and can be tailored in their dimensions to the diameter of the orifice (iv) and the mixing head. Preferably, the mixing head is therefore fixed tightly with the orifice (iv) in (i) or (iii) through which the introduction of the starting materials is effected.

Particularly preferably, the outflow end is not fastened directly to the layer (i) but is fixed to a holder which is screwed to (i). This holder, which may consist of conventional materials, for example plastics, wood or preferably conventional metals, is preferably a construction which has bores through which the threads fixed to (i) are led and are fastened, for example, by means of corresponding nuts. In addition, the holder has fastening elements for the outflow end, for example plug connections, screw connections or edges, by means of which the outflow end can be clamped to the holder by elastic bands. Particularly preferably, the outflow end is fastened at at least three points to the holder in order to avoid tilting. Thus, a holder is preferably screwed to at least three threads which are fastened to (i), and the mixing head is fixed to this holder. After completion of the composite elements, the bolts can be sawn off, for example at the surface of (i).

The filling of the space between (i) and (iii) with the liquid starting components for the preparation of (xx) can be carried out, preferably continuously, using conventional conveying apparatuses, for example using high and low pressure machines, preferably high pressure machines. The filling is preferably effected using a high pressure machine via one or more mixing heads, preferably one mixing head, in which the starting components are mixed. The filling of the space between (i) and (iii) can be effected both with a vertical orientation of (i) and (iii) and in the preferred horizontal orientation of (i) and (iii) described above. The delivery can be varied as a function of the volume to be filled. In order to ensure homogeneous curing of (ii), the delivery and conveying apparatus are preferably chosen so that the space to be filled can be filled in the course of from 0.5 to 20 minutes with the components for the production of (ii). Said apparatuses are preferably low pressure or particularly preferably high pressure machines, preferably with piston metering, particularly preferably axial piston metering, the storage container preferably being equipped with a stirrer and preferably being heatable, and a storage container-mixing head-storage container circulation preferably being present, the discharge rate preferably being from 0.1 to 3.0, preferably from 0.5 to 2.0, kg/sec.

The layers (i) and (iii) can preferably be used as conventional plastic, wood or preferably metal plates, for example iron, steel, copper and/or aluminum plates, having the thicknesses according to the invention. Both (i) and (ii) may be coated, for example primed, provided with a finish and/or coated with conventional plastics when used in the production of the novel composite elements. Preferably, (i) and (iii) are used in uncoated form. Before the production of the composite elements, the surfaces of (i) and (iii) can be blasted with sand or steel balls, preferably with corundum or iron pyrite, for cleaning and increasing the surface roughness. This blasting can be effected by the conventional method in which the shot strikes the surfaces, for example, under high pressure. Suitable apparatuses for such a treatment are commercially available. This treatment of the surfaces of (i) and (iii) which are in contact with (ii) after the reaction of (a) with (b) leads to a substantially improved adhesion of (ii) to (i) and (iii). The blasting is preferably carried out directly before introduction of the components for the production of (ii) into the space between (i) and (iii). The surfaces of (i) and (iii), to which (ii) is to adhere, are preferably free of inorganic and/or organic substances which reduce adhesion, for example dust, dirt, oils and fats or substances generally known as mold release agents.

The layers (i) and (iii) are preferably arranged parallel. The lateral edges of the space between (i) and (iii) which is filled with (ii) are preferably sealed, preferably with plastic, paper or metal films or plates, particularly preferably metal plates, which, for example, are adhesively bonded, welded or pressed on, preferably welded on, and which, if appropriate, may also serve as spacers.

The space to be filled can preferably be dried. This has the advantage that in particular liquid components to be filled which are reactive to water, for example isocyanates, do not undergo undesired secondary reaction. The drying, which preferably takes place directly before the filling, can be effected, for example, by means of hot air or by means of compressed air. Furthermore, the space to be filled between (i) and (iii) can be dried by heating (i) and/or (iii) to a temperature of from 20 to 150° C. for a duration of from 10 to 180 minutes. The space to be filled between (i) and (iii) can preferably be dried by means of a blower which passes air through orifices (iv) and (v) in (i) and/or (iii) through the space to be filled between (i) and (iii).

The orifices (iv) and (v) are preferably bores in (i) and/or (iii) having a diameter of from 0.5 to 5.0 cm in (i) and/or (iii).

The space which is filled between (i) and (iii) with the starting materials for the production of (ii) need not represent the entire space between (i) and (iii). Both (i) and (iii) may project at the edges beyond (ii), i.e. bonding of (i) via (ii) to (iii) takes place only in a part region of (i) and (iii). For example, the space between (i) and (iii) can be sealed prior to filling with the starting materials in such a way that the seal is present inside the space enclosed by (i) and (iii) and edges of (i) and/or (iii) project.

In the development of suitable production processes, it was found that uncontrolled running out of liquid starting components for the preparation of (xx) scarcely needs to be eliminated as an error. Owing to the limited amount per shot, an uncontrolled loss of starting material for the preparation of (xx) leads to incomplete filling of the space between (i) and (iii). Owing to the rapid reaction and the very good adhesion of (ii) to (i) and (iii), incomplete filling results in wide regions in the composite element which contain no (ii) and also can no longer be filled with starting components. Such composite elements unfortunately have to be discarded. In order to prevent a loss of starting components, it has therefore proven advantageous to check the mold to be filled very carefully for leaks. Usually, the layers (i) and (iii) are fixed in a suitable arrangement, for example parallel to one anther. The spacing is usually chosen so that the space (R) between (i) and (iii) has a thickness of from 10 to 300 mm. The fixing of (i) and (iii) can be effected, for example, by means of spacers, for example in a mold or suitable holder. The edges of the intermediate space are usually sealed so that the space between (i) and (iii) can be completely filled with (x) and the liquid or the starting components for the preparation of (xx), but these starting components are prevented from flowing out before filling is complete. The sealing can be effected using conventional plastic, paper or metal films and/or sheets which, for example, can be adhesively bonded, welded or pressed on and which, if appropriate, may also serve as spacers. This preferred sealing does not relate to the preferred orifices (iv) and (v) which were described at the outset. The checking of (R) for leaks prior to filling with the starting components is preferably effected by measurement of the pressure difference.

The expression measurement of the pressure difference is to be understood as meaning that an attempt is made to build up a pressure difference between the space (R) and the outer environment over a certain period, for example by attempting to achieve reduced pressure or superatmospheric pressure in relation to the outer environment in (R). This can be achieved by conventional vacuum pumps or generally known compressors which pump air or gas into the space (R). If it is possible to generate a stable superatmospheric pressure or reduced pressure in (R), this indicates a sufficiently tight cavity which can be filled with the starting components for the preparation of (ii). It should preferably be ensured that the orifices (iv) and (v) which are provided for filling (R) with the starting components or as vent orifices or as overflow orifices for the exit of excess starting components are likewise temporarily sealed. If appropriate, at least one of these orifices may serve for connecting a vacuum pump or compressor to (R).

The mold to be filled preferably consists of said layers (i) and (iii), which are preferably arranged parallel, and preferably of seals between the layers (i) and (iii), which prevent the liquid from running out during filling. The layer (ii) is thus preferably arranged with an adhesive bond between the layers (i) and (iii).

The liquid for the preparation of (xx) preferably contains (a) isocyanates and (b) compounds reactive toward isocyanates. The layer (ii) thus preferably comprises polyisocyanate polyadducts. In this document, the expressions starting materials or starting components are to be understood as meaning in particular (a) isocyanates and (b) compounds reactive toward isocyanates, but, if appropriate, if they are used, also (c) gases, (d) catalysts, (e) assistants and/or (f) blowing agents. The prefabricated polyisocyanate polyadducts (x) are also preferably based on these starting components. Particularly preferably, (x) and (xx) are identical in the starting components and particularly preferably also in their structure.

The reaction of (a) with (b) to give (ii) is preferably carried out in the presence of from 1 to 50% by volume of gases (c). Polymer polyols are preferably used as (b). The reaction of (a) with (b) is preferably carried out in the presence of (f) blowing agents.

The starting components for the preparation of the polyisocyanate polyadducts are usually mixed at a temperature of from 0 to 100° C., preferably from 20 to 60° C., and introduced, as described above, into the space between (i) and (iii). The mixing can be effected mechanically by means of a stirrer or a stirrer screw, but preferably by the countercurrent principle which is customary in high pressure machines and in which A and B component beams meet and mix under in each case high pressure in the mixing head, it also being possible for the beam of each component to be divided. The reaction temperature, i.e. the temperature at which reaction takes place, is usually >20° C., preferably from 50 to 150° C., depending on the material thickness.

The polyisocyanate polyadducts (ii) of the composite elements produced according to the invention preferably have a modulus of elasticity of >275 MPa in the temperature range from −45 to +50° C. (according to DIN 53 457), an adhesion to (i) and (iii) of >4 MPa (according to DIN 53 530), an elongation of >30% in the temperature range from −45 to +50° C. (according to DIN 53 504), a tensile strength of >20 MPa (according to DIN 53 504) and a compressive strength of >20 MPa (according to DIN 53 421).

The preparation of (xx) can therefore preferably be carried out by reacting (a) isocyanates with (b) compounds reactive toward isocyanates, if appropriate in the presence of blowing agents (f), from 1 to 50% by volume, based on the volume of the polyisocyanate polyadducts, of at least one gas (c), (d) catalysts and/or (e) assistants.

The preparation of such polyisocyanate polyadducts (ii) has been widely described. The starting materials (a), (b), (c), (d), (e) and (f) in the novel process are described by way of example below:

Suitable isocyanates (a) are the aliphatic, cycloaliphatic, araliphatic and/or aromatic isocyanates known per se, preferably diisocyanates, which, if appropriate, may have been biuretized and/or isocyanuratized by generally known methods. Specific examples are alkylene diisocyanates having 4 to 12 carbon atoms in the alkylene radical, such as dodecane 1,12-diisocyanate, 2-ethyltetramethylene 1,4-diisocyanate, 2-methylpentamethylene 1,5-diisocyanate, tetramethylene 1,4-diisocyanate, lysine ester diisocyanates (LDI), hexamethylene 1,6-diisocyanate (HDI), cyclohexane 1,3- and/or 1,4-diisocyanate, hexahydrotoluene 2,4- and 2,6-diisocyanate and the corresponding isomer mixtures, dicyclohexylmethane 4,4'-, 2,2'- and 2,4'-diisocyanate and the corresponding isomer mixtures, 1-isocyanato-3,3,5-trimethyl-5-isocyanato-methylcyclohexane (IPDI), tolylene 2,4- and/or 2,6-diisocyanate (TDI), diphenylmethane 4,4'-, 2,4'- and/or 2,2'-diisocyanate (MDI), polyphenylpolymethylene polyisocyanates and/or mixtures containing at least two of said isocyanates. Moreover, di- and/or polyisocyanates containing ester, urea, allophanate, carbodiimide, uretdione and/or urethane groups may be used in the novel process. 2,4'-, 2,2'- and/or 4,4'-MDI and/or polyphenylpolymethylene polyisocyanates are preferably used, particularly preferably mixtures containing polyphenylpolymethylene polyisocyanates and at least one of the MDI isomers.

For example, compounds which have hydroxyl, thiol and/or primary and/or secondary amino groups as groups reactive toward isocyanates and which usually have a molecular weight of from 60 to 10 000 g/mol, e.g. polyols selected from the group consisting of the polymer polyols, polyetherpolyalcohols, polyesterpolyalcohols, polythioetherpolyols, hydroxyl-containing polyacetals and hydroxyl-containing aliphatic polycarbonates or mixtures of at least two said polyols, can be used as (b) compounds reactive toward isocyanates. These compounds usually have a functionality with respect to isocyanates of from 2 to 6 and a molecular weight of from 400 to 8 000 and are generally known to a person skilled in the art.

For example, suitable polyetherpolyalcohols are those which are obtainable by a known technology by an addition reaction of alkylene oxides, for example tetrahydrofuran, 1,3-propylene oxide, 1,2- or 2,3-butylene oxide, styrene oxide and preferably ethylene oxide and/or 1,2-propylene oxide, with conventional initiators. Initiators which may be used are, for example, known aliphatic, araliphatic, cycloaliphatic and/or aromatic compounds which contain at least one hydroxyl group, preferably 2 to 4 hydroxyl groups, and/or at least one amino group, preferably 2 to 4 amino groups. For example, ethanediol, diethylene glycol, 1,2- and 1,3-propanediol, 1,4-butanediol, 1,5-pentanediol, 1,6-hexanediol, 1,7-heptanediol, glycerol, trimethylolpropane, neopentylglycol, sugar, for example sucrose, pentaerythritol, sorbitol, ethylenediamine, propanediamine, neopentanediamine, hexamethylenediamine, isophoronediamine, 4,4'-diaminodicyclohexylmethane, 2-(ethylamino)ethylamine, 3-(methylamino)propylamine, diethylenetriamine, dipropylenetriamine and/or N,N'-bis(3-aminopropyl)ethylenediamine may be used as initiators.

The alkylene oxides may be used individually, alternately in succession or as mixtures. Preferably used alkylene oxides are those which lead to primary hydroxyl groups in the polyol. Particularly preferably used polyols are those which were alkoxylated after the alkoxylation with ethylene oxide and thus have primary hydroxyl groups.

Compounds generally known from polyurethane chemistry, preferably styrene/acrylonitrile graft polyols, can be used as polymer polyols, a special class of the polyetherpolyols.

Particularly the use of polymer polyols can substantially reduce the shrinkage of the polyisocyanate polyadduct, for example of the polyurethane, and thus lead to improved adhesion of (ii) to (i) and (iii). If appropriate, blowing agents (f) and/or gases (c) can preferably be used as further measures for reducing the shrinkage. Suitable polyesterpolyols can be prepared, for example, from organic dicarboxylic acids of 2 to 12 carbon atoms, preferably aliphatic dicarboxylic acids of 4 to 6 carbon atoms, and polyhydric alcohols, preferably diols, of 2 to 12, preferably 2 to 6, carbon atoms. The polyesterpolyols preferably have a functionality of from 2 to 4, in particular from 2 to 3, and a molecular weight of from 480 to 3 000, preferably from 600 to 2 000, in particular from 600 to 1 500.

The novel composite elements are preferably produced using polyetherpolyalcohols as component (b) for reaction with the isocyanates, expediently those having an average functionality with respect to isocyanates of from 1.5 to 8, preferably from 2 to 6, and a molecular weight of from 400 to 8 000.

The use of polyetherpolyalcohols has considerable advantages owing to improved stability of the polyisocyanate polyadducts to hydrolytic cleavage and because of the lower viscosity, in each case in comparison with polyesterpolyalcohols. The improved stability to hydrolysis is advantageous in particular when used in shipbuilding. The lower viscosity of the polyetherpolyalcohols and of the reaction mixture for the production of (ii), containing the polyetherpolyalcohols, permits faster and easier filling of the space between (i) and (iii) with the reaction mixture for the production of the composite elements. Owing to the considerable dimensions, in particular of structural parts in shipbuilding, low-viscosity liquids are of considerable advantage.

As compounds reactive toward isocyanates, in addition to said compounds having a customary molecular weight of from 400 to 8 000, if appropriate diols and/or triols having molecular weights of from 60 to <400 may furthermore be used as chain extenders and/or crosslinking agents in the novel process. For modifying the mechanical properties, e.g. the hardness, however, the addition of chain extenders, crosslinking agents or, if appropriate, mixtures thereof may prove advantageous. The chain extenders and/or crosslinking agents preferably have a molecular weight of from 60 to 300. For example, aliphatic, cycloaliphatic and/or araliphatic diols of 2 to 14, preferably 4 to 10, carbon atoms are suitable, e.g. ethylene glycol, 1,3-propanediol, 1,10-decanediol, o-, m- and p-dihydroxycyclohexane, diethylene glycol, dipropylene glycol and preferably 1,4-butanediol, 1,6-hexanedioil and bis(2-hydroxyethyl)hydroquinone, triols, such as 1,2,4- and 1,3,5-trihydroxycyclohexane, glycerol and trimethylolpropane, low molecular weight hydroxyl-containing polyalkylene oxides based on ethylene oxide and/or 1,2-propylene oxide and the abovementioned diols and/or triols as initiator molecules and/or diamines, e.g. diethyltoluenediamine and/or 3,5-dimethylthio-2,4-toluenediamine.

If chain extenders, crosslinking agents or mixtures thereof are used for the preparation of the polyisocyanate polyadducts, they are expediently employed in an amount of from 0 to 30, preferably from 1 to 30, % by weight, based on the weight of the compounds (b) reactive toward isocyanates which are used altogether.

Moreover, aliphatic, araliphatic, cycloaliphatic and/or aromatic carboxylic acids can be used as (b) for optimizing the course of curing in the production of (ii). Examples of such carboxylic acids are formic acid, acetic acid, succinic acid, oxalic acid, malonic acid, glutaric acid, adipic acid, citric acid, benzoic acid, salicylic acid, phenylacetic acid, phthalic acid, toluenesulfonic acid, derivatives of said acids, isomers of said acids and any desired mixtures of said acids. The amount by weight of these acids may be from 0 to 5, preferably from 0.2 to 2, % by weight, based on the total weight of (b).

With the use of amine-initiated polyetherpolyalcohols, the curing behavior of the reaction mixture for the production of (ii) can additionally be improved. Preferably, the compounds (b), as well as the other components for the production of (ii), are used with a very low content of water in order to avoid the formation of carbon dioxide by reaction of the water with isocyanate groups.

Generally known compounds which have a boiling point at a pressure of 1 bar of less than (i.e. at temperatures less than) −50° C., for example air, carbon dioxide, nitrogen, helium and/or neon, can be used as component (c) for the production of (ii). Air is preferably used. The component (c) is preferably inert to the component (a), particularly preferably to the components (a) and (b), i.e. reactivity of the gas with respect to (a) and (b) is scarcely detectable, preferably undetectable. The use of the gas (c) differs fundamentally from the use of conventional blowing agents for the preparation of foamed polyurethanes. While conventional blowing agents (f) are used in liquid form or, in the case of the gaseous physical blowing agents, are slightly soluble in the polyol component and either evaporate during the reaction owing to evolution of heat or, in the case of water, evolve gaseous carbon dioxide owing to the reaction with the isocyanate groups, in the present invention the component (c) is preferably used in gaseous form as an aerosol, for example in the polyol component.

Catalysts (d) which may be used are generally known compounds which greatly accelerate the reaction of isocyanates with the compounds reactive toward isocyanates, a total catalyst content of from 0.001 to 15, in particular from 0.05 to 6, % by weight, based on the weight of the compounds reactive toward isocyanates which are used altogether preferably being employed. For example, the following compounds may be used: triethylamine, tributylamine, dimethylbenzylamine, dicyclohexylmethylamine, dimethylcyclohexylamine, N,N,N',N'-tetramethyldiaminodiethyl ether, bis(dimethylaminopropyl)urea, N-methyl- and N-ethylmorpholine, N-cyclohexylmorpholine, N,N,N',N'-tetramethylethylenediamine, N,N,N',N'-tetramethylbutanediamine, N,N,N',N'-tetramethylhexane-1,6-diamine, pentamethyldiethylenetriamine, dimethylpiperazine, N-dimethylaminoethylpiperidine, 1,2-dimethylimidazole, 1-azabicyclo[2.2.0]octane, 1,4-diazabicyclo[2.2.2]octane (Dabco) and alkanolamine compounds, such as triethanolamine, triisopropanolamine, N-methyl- and N-ethyldiethanolamine, dimethylaminoethanol, 2-(N,N-dimethylaminoethoxy)ethanol, N,N',N"-tris(dialkylaminoalkyl)hexahydrotriazines, e.g. N,N',N"-tris(dimethylaminopropyl)-s-hexahydrotriazine, iron(II) chloride, zinc chloride, lead octanoate and preferably tin salts, such as tin dioctanoate, tin diethylhexanoate, dibutyltin dilaurate and/or dibutyldilauryltin mercaptide, 2,3-dimethyl-3,4,5,6-tetrahydropyrimidine, tetraalkylammonium hydroxides, such as tetramethylammonium hydroxide, alkali metal hydroxides, such as sodium hydroxide, alkali metal alcoholates, such as sodium methylate and potassium isopropylate, and/or alkali metal salts of long-chain fatty acids having 10 to 20 carbon atoms and, if appropriate, OH side groups.

It has proven very advantageous to carry out the production of (ii) in the presence of (d) in order to accelerate the reaction.

If appropriate, (e) assistants may be incorporated into the reaction mixture for the preparation of the polyisocyanate polyadducts (ii). Examples are fillers, surface-active substances, dyes, pigments, flameproofing agents, hydrolysis stabilizers, fungistatic and bacteriostatic substances and foam stabilizers.

Examples of suitable surface-active substances are compounds which serve for promoting the homogenization of the starting materials and, if appropriate, are also suitable for regulating the structure of the plastics. Examples are emulsifiers, such as the sodium salts of castor oil sulfates or of fatty acids and salts of fatty acids with amines, e.g. of diethylamine with oleic acid, of diethanolamine with stearic acid, of diethanolamine with ricinoleic acid, salts of sulfonic acids, e.g. alkali metal or ammonium salts of dodecylbenzene- or dinaphthylmethanedisulfonic acid and ricinoleic acid. The surface-active substances are usually used in amounts of from 0.01 to 5% by weight, based on 100% by weight of the compounds (b) reactive toward isocyanates which are used altogether.

Suitable flameproofing agents are, for example, tricresyl phosphate, tris(2-chloroethyl) phosphate, tris(2-chloropropyl) phosphate, tris(1,3-dichloropropyl) phosphate, tris(2,3-dibromopropyl) phosphate, tetrakis(2-chloroethyl) ethylene diphosphate, dimethyl methanephosphonate, diethyl diethanolaminomethylphosphonate and commercially available halogen-containing polyol flameproofing agents. In addition to the abovementioned halogen-substituted phosphates, it is also possible to use inorganic or organic flameproofing agents, such as red phosphorus, hydrated aluminum, antimony trioxide, arsenic oxide, ammonium polyphosphate and calcium sulfate, expanded graphite or cyanuric acid derivatives, such as melamine, or mixtures of at least two flameproofing agents, e.g. ammonium polyphosphates and melamine and, if appropriate, cornstarch or ammonium polyphosphate, melamine and expanded graphite and/or, if appropriate, aromatic polyesters for flameproofing the polyisocyanate polyadducts. In general, it has proven expedient to use from 5 to 50, preferably from 5 to 25, % by weight, based on the weight of the compounds reactive toward isocyanates which are used altogether, of said flameproofing agents.

Fillers, in particular reinforcing fillers, are to be understood as meaning the conventional organic and inorganic fillers, reinforcing agents, weighting agents, compositions for improving the abrasion behavior in surface coatings, coating materials, etc., which are known per se. Specific examples are: inorganic fillers, such as silicate minerals, for example sheet silicates, such as antigorite, serpentine, hornblends, amphibole, chrysotile and talc, metal oxides, such as kaolin, aluminas, titanium oxides and iron oxides, metal salts, such as chalk, barite and inorganic pigments, such as cadmium sulfide and zinc sulfide, and glass, etc. Kaolin (china clay), aluminum silicate and coprecipitates of barium sulfate and aluminum silicate and natural and synthetic fibrous minerals, such as wollastonite, and short metal fibers and glass fibers are preferably used. Examples of suitable organic fillers are: carbon, melamine, rosin, cyclopentadienyl resins and graft polymers and cellulose fibers, polyamide, polyacrylonitrile, polyurethane and polyester fibers based on aromatic and/or aliphatic dicarboxylic esters and in particular carbon fibers. The inorganic and organic fillers can be used individually or as mixtures.

Preferably from 10 to 70% by weight, based on the weight of (ii), of fillers are used as (e) assistants in the production of (ii). Fillers used are preferably talc, kaolin, calcium carbonate, barite, glass fibers and/or glass microspheres. The size of the particles of the fillers is preferably to be chosen so that the introduction of the components for the production of (ii) into the space between (i) and (iii) is not hindered. Particularly preferably, the fillers have particle sizes of <0.5 mm.

The fillers are preferably used as a mixture with the polyol component in the reaction for the preparation of the polyisocyanate polyadducts.

The fillers can serve for reducing the coefficient of thermal expansion of the polyisocyanate polyadducts, which is greater in comparison with, for example, steel, and thus for adapting said coefficient to that of steel. This is particularly advantageous for a permanently strong bond between the layers (i), (ii) and (iii), since lower stresses between the layers occur thereby under thermal load.

Conventional foam stabilizers which are commercially available and are generally known to a person skilled in the art, for example generally known polysiloxane/polyoxyalkylene block copolymers, e.g. Tegostab 2219 from Goldschmidt, are preferably used as (e) for the production of (ii). The amount of these foam stabilizers in the production of (ii) is preferably from 0.001 to 10, particularly preferably from 0.01 to 10, in particular from 0.01 to 2, % by weight, based on the weight of the components (b), (e) and, if appropriate, (d) used for the production of (ii). The use of these foam stabilizers results in stabilization of the component (c) in the reaction mixture for the production of (ii).

Blowing agents generally known from polyurethane chemistry, for example physical and/or chemical blowing agents, can be used as blowing agents (f). Such physical blowing agents generally have a boiling point at a pressure of 1 bar of greater than (i.e. at temperatures higher than) −50° C. Examples of physical blowing agents are CFCs, HCFCs, HFCs, aliphatic hydrocarbons, cycloaliphatic hydrocarbons, for example each of 4 to 6 carbon atoms, or mixtures of these substances, for example trichlorofluoromethane (boiling point 24° C.), chlorodifluoromethane (boiling point −40.8° C.), dichlorofluoroethane (boiling point 32° C.), chlorodifluoroethane (boiling point −9.2° C.), dichlorotrifluoroethane (boiling point 27.1° C.), tetrafluoroethane (boiling point −26.5° C.), hexafluorobutane (boiling point 24.6° C.), isopentane (boiling point 28° C.), n-pentane (boiling point 36° C.), cyclopentane (boiling point 49° C.).

Suitable chemical blowing agents, i.e. blowing agents which form gaseous products as a result of a reaction, for example with isocyanate groups, are, for example, water, compounds containing water of hydration, carboxylic acids, tert-alcohols, e.g. tert-butanol, carbamates, for example the carbamates described in EP-A 1000955, in particular on page 2, lines 5 to 31 and page 3, lines 21 to 42, carbonates, e.g. ammonium carbonate and/or ammonium bicarbonate, and/or guanidine carbamate.

Preferably used blowing agents (f) are water and/or carbamates.

The blowing agents (f) are preferably used in an amount which is sufficient to obtain the preferred density of (ii) of from 350 to 1200 kg/m$^3$. This can be determined by simple routine experiments which are generally familiar to a person skilled in the art. Particularly preferably, the blowing agents (f) are used in an amount of from 0.05 to 10, in particular from 0.1 to 5, % by weight, based in each case on the total weight of the polyisocyanate polyadducts.

The weight of (ii) corresponds by definition to the weight of the components (a), (b) and, if appropriate (c), (d), (e) and/or (f) used for the production of (ii).

For the preparation of the novel polyisocyanate polyadducts, the isocyanates and the compounds reactive toward isocyanates are reacted in amounts such that the ratio of the number of equivalents of NCO groups of the isocyanates (a) to the sum of the reactive hydrogen atoms of the compounds (b) reactive toward isocyanates and, if appropriate, (f) is from 0.85:1 to 1.25:1, preferably from 0.95:1 to 1.15:1, in particular from 1:1 to 1.05:1. If (ii) contains at least some isocyanurate groups in bound form, a ratio of NCO groups to the sum of the reactive hydrogen atoms of from 1.5:1 to 60:1, preferably from 1.5:1 to 8:1, is usually used.

The polyisocyanate polyadducts are usually prepared by the one-shot process or by the prepolymer process, for example with the aid of the high pressure or low pressure technique.

It has proven particularly advantageous to employ the two-component process and to combine the compounds (b) reactive toward isocyanates, if appropriate the blowing agents (f) and, if appropriate, the catalysts (d) and/or assistants (e) in the component (A) (polyol component) and preferably to mix them thoroughly with one another, and to use the isocyanates (a) as component (B).

The component (c) can be added to the reaction mixture containing (a), (b) and, if appropriate, (f), (d) and/or (e), and/or the individual components (a), (b), (A) and/or (B) described above. The component which is mixed with (c) is usually present in liquid form. The components are preferably mixed into the component (b).

The mixing of the corresponding component with (c) can be effected by generally known methods. For example, (c) can be added to the corresponding components by generally known loading means, for example air loading means, preferably under pressure, for example from a pressurized container or after compression by a compressor, for example through a nozzle. Substantial mixing of the corresponding components with (c) is preferably effected so that gas bubbles of (c) in the usually liquid components preferably have a size of from 0.0001 to 10, particularly preferably from 0.0001 to 1, mm.

The content of (c) in the reaction mixture for the production of (ii) can be determined in the return line of the high pressure machine by means of generally known measuring apparatuses via the density of the reaction mixture. The content of (c) in the reaction mixture can be regulated via a control unit, preferably automatically on the basis of this density. The component density can be determined online and regulated during the customary circulation of the material in the machine, also at very low circulation velocity.

The composite elements obtainable according to the invention are used in particular in areas which require construction elements which withstand large forces, for example as structural parts in shipbuilding, for example in ships' hulls, for example ships' double hulls having an outer and an inner wall, and hold covers, hold partitions or loading flaps, or in structures, for example bridges, or as construction elements in house construction, in particular in multistory buildings.

The novel composite elements should not be confused with classical sandwich elements which contain a rigid polyurethane and/or polyisocyanurate foam as a core and are usually used for thermal insulation. Owing to their comparatively low mechanical load capacity, such known sandwich elements would not be suitable for said applications.

I claim:

1. A composite element comprising:
   a layer (i) having a thickness from 2 to 20 mm and is metal, plastic or wood,
   a layer (ii) having a thickness from 10 to 300 mm comprising polyisocyanate polyadducts,
   a layer (iii) having a thickness from 2 to 20 mm and is metal, plastic or wood,
   wherein the layer (ii) is between the layers (i) and (iii) and comprises polyisocyanate polyadducts (x) which are adhesively bonded to the layers (i) and (iii) by polyisocyanate polyadducts (xx), and the polyisocyanate polyadducts (x) are individual pieces each having a volume of from 4 to 1,000 cm$^3$, wherein the polyisocyanate polyadducts (xx) completely include the polyisocyanate polyadducts (x) individual pieces, and
   wherein the polyisocyanate polyadducts (x) individual pieces have a density of from 900 to 1,200 kg/m$^3$.

2. The composite element according to claim 1, wherein the polyisocyanate polyadducts (x) individual pieces are obtained by comminution of polyisocyanate polyadducts or by shaping polyisocyanate polyadducts into units.

3. The composite element according to claim 1, wherein the polyisocyanate polyadducts (x) occupy from 10% to 90% of the volume of the layer (ii).

4. The composite element according to claim 1, wherein the polyisocyanate polyadducts (xx) occupy from 10% to 90% of the volume of the layer (ii).

5. A ship or structure comprising a composite element according to claim 1.

6. The composite element according to claim 1, wherein the density is from 1,000 to 1,100 kg/m$^3$.

7. A process of producing composite elements, the process comprising:
   (a) prefabricating polyisocyanate polyadducts (x) by comminuting polyisocyanate polyadducts or by shaping the starting polyisocyanate polyadducts into units;
   (b) providing a layer (i) and a layer (iii);
   (c) introducing the prefabricated polyisocyanate polyadducts (x) into a space of a layer (ii), which is between the layers (i) and (iii); and then
   (d) introducing at least one liquid starting material for a preparation of polyisocyanate polyadducts (xx) into the remaining space of the layer (ii) which is not filled with the prefabricating polyisocyanate polyadducts (x) individual pieces, wherein the polyisocyanate polyadducts (xx) completely include the polyisocyanate polyadducts (x) individual pieces; and
   curing the polyisocyanate polyadducts (xx), thereby adhering the polyisocyanate polyadducts (x) individual pieces to the layers (i) and (iii),
   wherein the layer (i) has a thickness from 2 to 20 mm and is metal, plastic or wood,
   the layer (ii) has a thickness from 10 to 300 mm and comprises the polyisocyanate polyadducts (x) individual pieces and the polyisocyanate polyadducts (xx),
   the layer (iii) has a thickness from 2 to 20 mm and is metal, plastic or wood and the polyisocyanate adducts (x) individual pieces have a density of from 900 to 1,200 kg/m$^3$.

8. The process according to claim 7, wherein the layer (ii) has a width of from 0.5 to 4 m, a length of from 1 to 12 m and a height, which is a distance between the layers (i) and (iii), of from 20 to 150 mm.

9. The process according to claim 7, wherein the space to be filled between the layer (i) and the layer (iii) is dried after (b) at a temperature of 20-150° C.

10. The composite element according to claim 1, wherein the layers (i) and/or (iii) are provided with a finish and/or coated with plastics.

11. The process according to claim 7, wherein the layers (i) and/or (iii) are provided with a finish and/or coated with plastics.

12. The process according to claim 7, wherein the polyisocyanate polyadducts (x) individual pieces have a density of from 1,000 to 1,100 kg/m$^3$.

13. The process according to claim 7, wherein each of the polyisocyanate polyadducts (x) individual pieces has a volume of from 4 to 1,000 cm$^3$.

14. The process according to claim 7, wherein the polyisocyanate polyadducts (x) occupy from 10% to 90% of the volume of the layer (ii).

15. The process according to claim 7, wherein the polyisocyanate polyadducts (xx) occupy from 10% to 90% of the volume of the layer (ii).

* * * * *